N. F. RUTHERFORD.
SUSPENSION APPARATUS.
APPLICATION FILED MAY 16, 1919.
1,391,794. Patented Sept. 27, 1921.
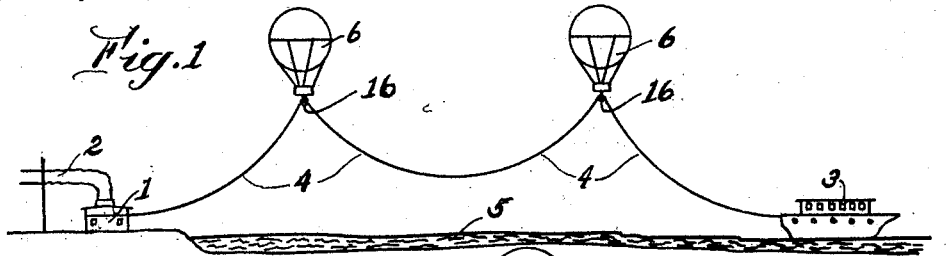
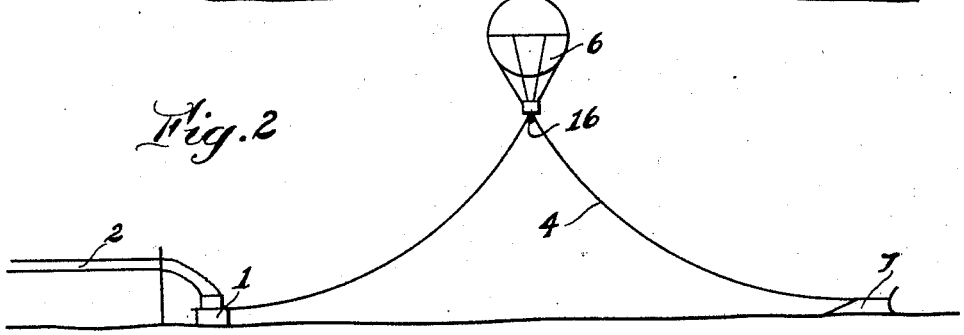
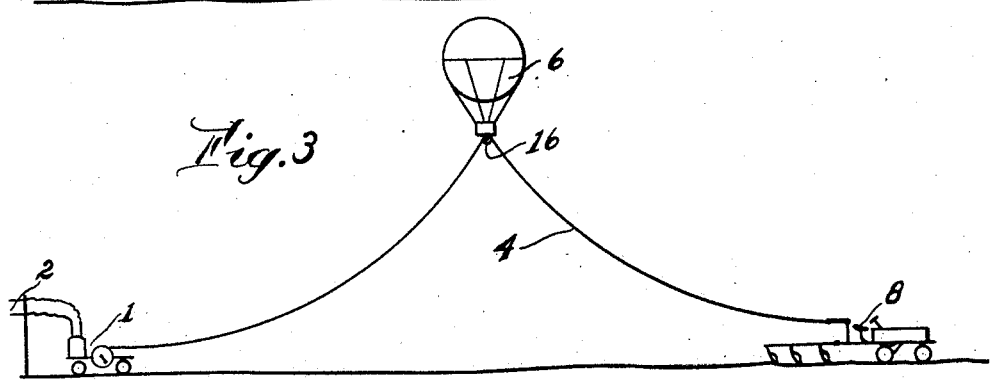
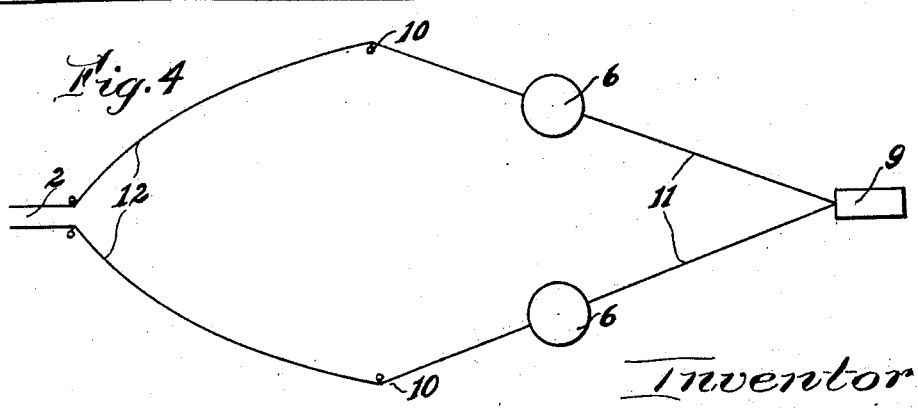
Inventor:
Norman F. Rutherford
by Roberts Roberts & Cushman
Att'ys.

UNITED STATES PATENT OFFICE.

NORMAN F. RUTHERFORD, OF EAST FALMOUTH, MASSACHUSETTS.

SUSPENSION APPARATUS.

1,391,794.  Specification of Letters Patent.  Patented Sept. 27, 1921.

Application filed May 16, 1919. Serial No. 297,450.

*To all whom it may concern:*

Be it known that I, NORMAN F. RUTHERFORD, a subject of the King of Great Britain, and resident of East Falmouth, in the county of Barnstable and State of Massachusetts, have invented new and useful Improvements in Suspension Apparatus, of which the following is a specification.

This invention relates to a suspension apparatus and more particularly to an aeronautical apparatus for suspending a power transmission line.

In places where electric power is accessible, often it cannot be employed for many purposes such as driving agricultural implements, working ferry boats, harvesting ice, driving excavating machinery, or other apparatus of a similar nature, because of the expense and difficulty of constructing and maintaining properly supported and insulated transmission lines. Especially in agriculture the fields over which implements must be driven are often extensive and widely separated and should be free from obstruction. If electric power is to be utilized, a transmission line must be extended over the field in such a manner that a mobile implement may obtain power therefrom when moving in any section of the field. This necessitates the installation of an expensive transmission line and the employment of long flexible cables for connecting the line with the implement, which cables must be dragged over the ground by the implement as it moves about, thereby hampering movement of the implement.

If electric power is to be transmitted over water, as for operating boats, a further difficulty arises in connecting the boat with the source of power as with transmission means heretofore known the cable must lie in the water and be thoroughly insulated therefrom.

One object of my invention is to provide improved suspension apparatus for sustaining a power transmission means. A further object of my invention is to provide an aeronautical apparatus for automatically taking up the slack in a flexible transmission cable which connects a source of power and a mobile power consuming device in such a manner that the cable is kept clear of the ground or water irrespective of the position of the device relative to the power source. A further object is to provide a transmission wherein a grounded circuit may be used requiring but a single wire cable.

I have illustrated several specific examples of the invention in order to express the genus comprising these and many other aspects of the invention which might be shown.

In the drawings,—

Figure 1 diagrammatically shows a flexible transmission line connecting a power source and a boat, the line being supported by a plurality of balloons;

Fig. 2 shows a flexible transmission line connecting a power source and an excavating machine, the line being supported by a single balloon;

Fig. 3 shows a transmission line supported by a single balloon and connecting a power source and any agricultural implement such as a gang plow.

Fig. 4 shows in plan view two balloons separately sustaining the two conductors of a flexible transmission line.

In Fig. 1, a transformer station is shown on land at 1, connected to any suitable source of electric power by transmission line 2. The station 1 is connected to the boat 3 by a thin light flexible cable 4. To sustain the cable 4 and prevent it from contacting with the water 5, the cable is secured at suitable positions along its length to captive balloons 6. The balloons may be connected to suitable trucks or windlasses by lead ropes to allow them to be let up or hauled down or they may be entirely controlled by the flexible cable 4. Where the cable 4 is of considerable length several balloons would be used to support it. As the boat 3 moves to and from the shore the balloons rise and fall to take up or let out slack in the cable 4, keeping it free from the water at all times. The balloons may be attached to the cable by any suitable means as by sheave wheels 16.

In Fig. 2, the transformer station 1 is shown connected to an excavating machine 7 by means of a cable 4. The cable is sustained by a single balloon 6. The excavating machine may be in the nature of a motor driven ore stripper, shovel or dredge.

In Fig. 3 the invention is shown applied to agriculture, an agricultural implement 8 being connected to the transformer 1 by the cable 4 sustained by the balloon 6.

Each of two or more flexible conductors of the transmission cables may be separately supported by separate balloons as shown in Fig. 4 in which a mobile power consuming device of any desired nature is shown at 9 insulatedly connected to two posts 10 anchored in the ground, by flexible conductors 11 each supported by a balloon 6. The conductors 11 are electrically connected to the transmission line 2 by conductors 12.

In all the above modifications it is possible to ground the power consuming device and utilize the earth as a part of the circuit. This necessitates only a single wire to be supported by the balloon and as this may be without any insulation whatever a maximum lightness of the cable is thus possible.

While I have shown a balloon in the several figures of the drawing for sustaining the cables, it is obvious that other aeronautical apparatus may be employed.

I claim:

1. An apparatus comprising a source of electrical energy, a transmission line connected thereto, an electrical energy consuming device connected to the end of said line and contacting with the earth thereby requiring contiguity of the end of said line and the earth and a means for insulating said line from earth contact, said means permitting movement of said device anywhere within the area swept by the line and simultaneously operating to take up any slack in said line.

2. An apparatus comprising a source of electrical energy, a transmission line connected thereto, an electrical energy consuming device connected to the end of said line and contacting with the earth, thereby requiring a contiguity of the end of said line and the earth, and a balloon connected to said line for sustaining the line from earth contact, thereby insulating the line, said balloon permitting movement of said device anywhere within the area swept by the line and simultaneously operating to take up any slack in said line.

3. An apparatus comprising a source of electrical energy, a line for transmitting the energy therefrom, said line comprising an uninsulated conductor, an electrical energy consuming device connected to the end of said line and contacting with the earth, thereby requiring contiguity of the end of said line and the earth, a means for supporting said line at a point intermediate its length, said supporting means being so constructed and arranged as to prevent leakage of current therefrom to the earth while permitting movement of said device anywhere within the area swept by the line, and a return ground circuit between said device and said source.

4. In combination with a mobile power consuming device having continuous electric connection with the earth, a source of electric energy having a grounded terminal, a single flexible conductor connecting said power consuming device and said source of energy, and freely mobile means supporting said conductor at a point intermediate its length, said means normally tending to lift said conductor vertically away from the earth whereby to take up slack therein and to insulate the same.

Signed by me at East Falmouth, Massachusetts, this tenth day of May, 1919.

NORMAN F. RUTHERFORD.